United States Patent
Benhase et al.

(10) Patent No.: US 7,305,526 B2
(45) Date of Patent: Dec. 4, 2007

(54) METHOD, SYSTEM, AND PROGRAM FOR TRANSFERRING DATA DIRECTED TO VIRTUAL MEMORY ADDRESSES TO A DEVICE MEMORY

(75) Inventors: Michael Thomas Benhase, Tucson, AZ (US); Robert Alan Cargnoni, Austin, TX (US); James Stephen Fields, Jr., Austin, TX (US); Michael John Mayfield, Austin, TX (US); Bruce Mealey, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 10/982,354

(22) Filed: Nov. 5, 2004

(65) Prior Publication Data

US 2006/0101226 A1   May 11, 2006

(51) Int. Cl.
*G06F 12/06* (2006.01)
*G06F 12/10* (2006.01)
*G06F 13/36* (2006.01)
*G06F 3/00* (2006.01)

(52) U.S. Cl. .................... 711/154; 711/204; 710/310; 710/9

(58) Field of Classification Search .................. None
See application file for complete search history.

(56) References Cited

U.S. PATENT DOCUMENTS

| 5,317,715 | A | | 5/1994 | Johnson et al. |
| 5,835,972 | A | | 11/1998 | Choate |
| 6,101,568 | A | * | 8/2000 | Richardson .................. 710/310 |
| 6,370,622 | B1 | | 4/2002 | Chiou et al. |
| 6,615,321 | B2 | | 9/2003 | Arimilli et al. |
| 6,694,417 | B1 | | 2/2004 | Liao et al. |
| 6,725,289 | B1 | * | 4/2004 | Waldspurger et al. ......... 710/9 |
| 7,127,586 | B2 | * | 10/2006 | Mowry ........................ 711/204 |
| 2005/0240995 | A1 | * | 10/2005 | Ali et al. ...................... 726/16 |

* cited by examiner

*Primary Examiner*—Hyung Sough
*Assistant Examiner*—Duc T. Doan
(74) *Attorney, Agent, or Firm*—David W. Victor; Konrad Raynes & Victor LLP

(57) ABSTRACT

Provided are a method, system, and program for transferring data directed to virtual memory addresses to a device memory. Indicator bits are set for ranges of device memory addresses in a device accessible over an Input/Output (I/O) bus indicating whether gathering is enabled for the device memory address ranges. Transfer operations are processed to transfer data to contiguous device memory addresses in the device. A determination is made as to whether the indicator bits for the contiguous device memory addresses indicate that gathering is enabled. A single bus I/O transaction is generated to transfer data for the contiguous device memory addresses over the I/O bus in response to determining that the indicator bits for the contiguous device memory addresses indicate that gathering is enabled.

27 Claims, 4 Drawing Sheets

Translation Lookaside Buffer (TLB)

METHOD, SYSTEM, AND PROGRAM FOR TRANSFERRING DATA DIRECTED TO VIRTUAL MEMORY ADDRESSES TO A DEVICE MEMORY

BACKGROUND OF THE INVENTION

1. Field of the Invention

The present invention relates to a method, system, and program for transferring data directed to virtual memory addresses to a device memory.

2. Description of the Related Art

A processor performs operations with respect to a fast-access local memory, such as loading operands from the local memory to processor registers to use with instructions being executed and storing operands from the processor registers to the local memory. Local memory address ranges may map to device memory address ranges, where the processor communicates with the device memory over an Input/Output (Bus), such as a Peripheral Component Interconnect (PCI) bus. A Memory Mapped Input Output (MMIO) component within the processor processes store operations to virtual memory addresses that map to local memory or to device memory addresses by generating an I/O bus transaction to transfer the data directed to a virtual address to the corresponding location in the device memory. In this way, the device memory addresses appear to the processor as local memory addresses.

To improve the performance of store operations to virtual addresses that are transferred over the I/O bus to device memory, the MMIO component may aggregate/gather multiple store operations to contiguous device memory addresses into a single burst transaction over the I/O bus to improve the performance of the transfer of data to the device memory addresses over the bus. However, many devices, such as adaptors and legacy devices, do not support I/O burst transactions to device registers in the device memory. Thus, if the MMIO component supports store gathering, store gathering would not work with devices that do not support I/O burst transactions to device registers. One solution to this compatibility issue is to have the programmer add barrier instructions between those store operations to the device registers to require that each store operation be processed individually and not aggregated. Another solution is to disable store gathering in the MMIO component to avoid burst transactions to the device registers over the I/O bus.

SUMMARY

Provided are a method, system, and program for transferring data directed to virtual memory addresses to a device memory. Indicator bits are set for ranges of device memory addresses in a device accessible over an Input/Output (I/O) bus indicating whether gathering is enabled for the device memory address ranges. Transfer operations are processed to transfer data to contiguous device memory addresses in the device. A determination is made as to whether the indicator bits for the contiguous device memory addresses indicate that gathering is enabled. A single bus I/O transaction is generated to transfer data for the contiguous device memory addresses over the I/O bus in response to determining that the indicator bits for the contiguous device memory addresses indicate that gathering is enabled.

DETAILED DESCRIPTION

Figure 1:
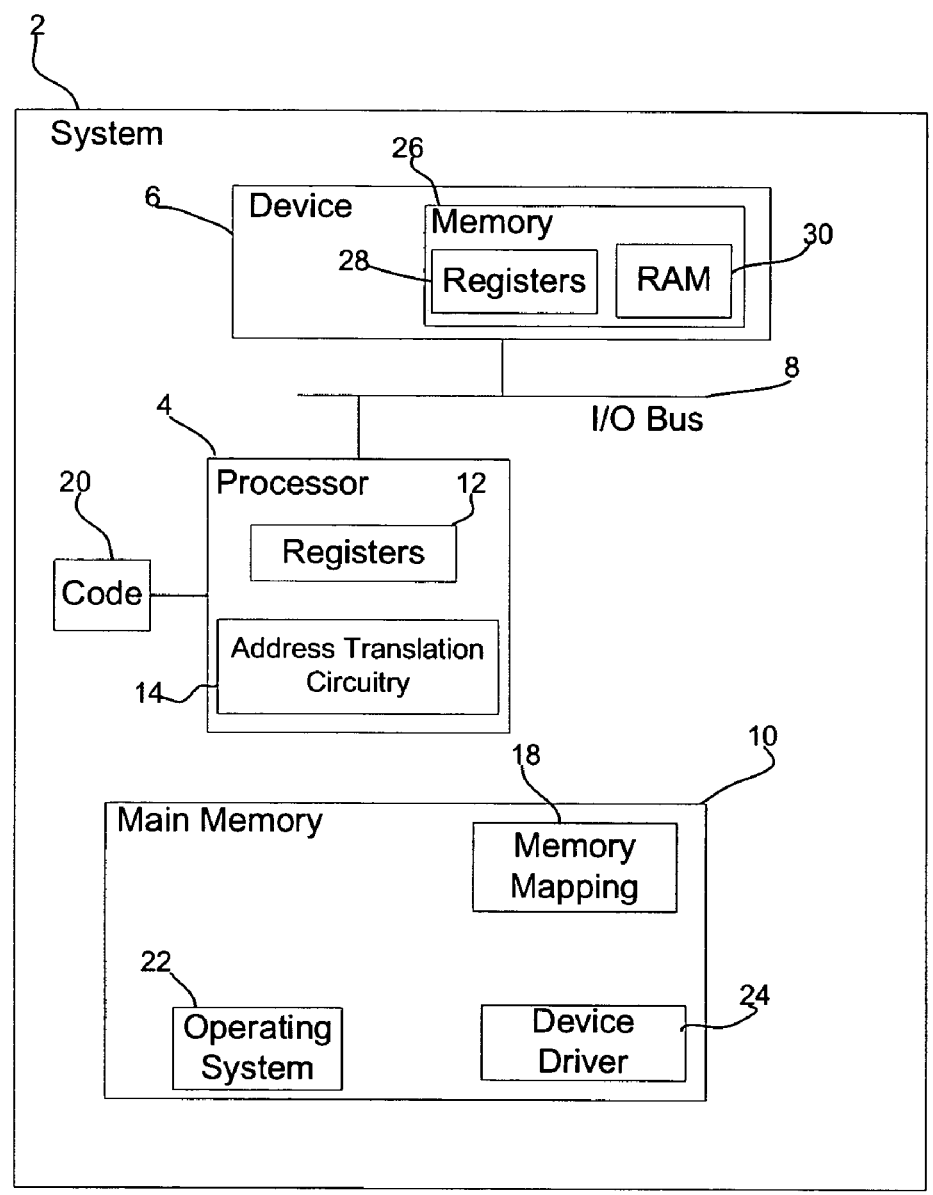
FIG. 1 illustrates an embodiment of a computing environment.

FIG. 1 illustrates an embodiment of a computing environment. A system 2 includes a processor 4 and device 6 that communicate over an Input/Output (I/O) bus 8. The I/O bus 8 may comprise a Peripheral Component Interconnect (PCI) bus or other bus interface known in the art. The processor 4 may store data in a main memory 10, such as operands and other data being operated upon. The processor 4 includes registers 12 and address translation circuitry 14 to handle requests directed to a virtual address space defined in the memory mapping 18. The processor executes code 20 by loading the instructions from the code 20 into the registers 12 and virtual addresses to execute. The code 20 may comprise the processor instruction set implemented in non-volatile memory, such as a Read Only Memory (ROM) device. The main memory 10 comprises a volatile memory device in which an operating system 22, device driver 24 and other programs are loaded. The device driver 24 provides an interface between the device 6 and programs that access the device 6. The device 6 may comprise an adaptor or other I/O device and includes memory 26 having device registers 28 used to control device 6 operations and Random Access Memory (RAM) 30 to which data may be written.

During system initialization, the device driver 24 may request a memory mapping 18 of virtual addresses that map to device memory 26 addresses to allow the processor 4 to transfer information to the device. In such case, the address translation circuitry 14 uses the memory mapping 18, which defines the virtual address space, when processing a store or other transfer operation to virtual memory addresses mapping to corresponding device memory 26 addresses. The processor 4 when executing instructions performs a load operation to load a value from the virtual addresses into the registers 12 and performs a store operation to copy data from a register 12 to the virtual addresses. The address translation circuitry 14 issues an I/O bus transaction to transfer the data subject to the store operation to the corresponding device memory addresses and an I/O bus transaction to transfer the data subject to a load operation from the corresponding device memory addresses to registers 12. In one embodiment, the address translation circuitry 14 may implement the Memory Mapped Input/Output (MMIO) memory protocol to map virtual addresses to device memory 26 addresses, so that store operations directed to the virtual addresses are transferred over the I/O bus 8 to the corresponding device memory 26 addresses. In alternative embodiments, the address translation circuitry 14 may implement other memory transfer protocols known in the art.

Figure 2:
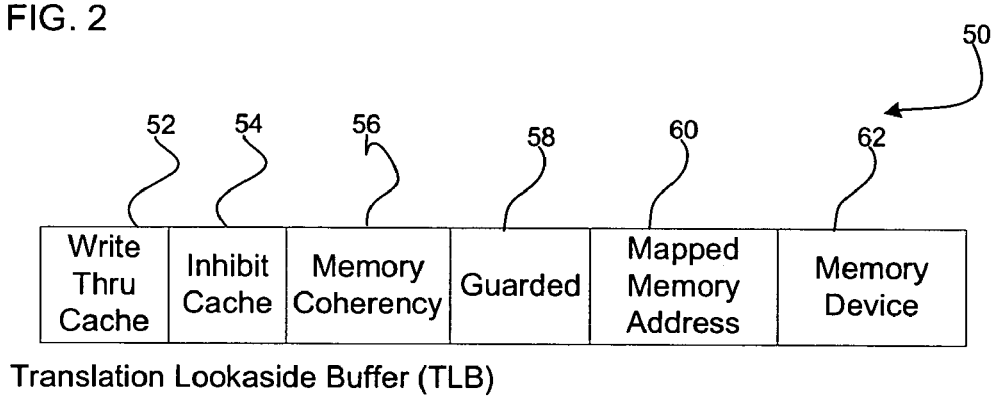
FIG. 2 illustrates an embodiment of information maintained for virtual memory addresses mapping to device or main memory addresses.

FIG. 2 illustrates information maintained for virtual address ranges, such as 4 Kb (kilobyte) ranges, that map to a corresponding device memory 26 address range. The memory mapping 18 may include one entry 50 for each virtual address range, such as a 4 Kb range of virtual addresses. In one embodiment, the information maintained for each virtual addresses range and corresponding device memory 26 address range, e.g., 4 Kb virtual address range, comprises a Translation Lookaside Buffer (TLB) 50, wherein there is one TLB 50 for each virtual address range. Each TLB 50 includes a write-thru cache flag 52 indicating whether data written to virtual addresses is also written to cache and the device memory 26 or the main memory 10; an inhibit cache flag 54 indicates whether caching of data in virtual addresses is enabled; a memory coherency flag 56 indicating whether changes to data made by the device to the device memory 26 or main memory 10 are reflected in the processor cache in the main memory 10; a guarded bit 58 indicating whether store gathering is enabled and speculative prefetching is enabled when accessing a virtual address; a mapped memory address 60 identifying the physical address to which the virtual address maps, which may comprise a device memory 26 address or main memory 10 address; and a memory device field 62 indicating where the memory to which the virtual address range maps is located, e.g., device memory 26 or main memory 10 includes. The address translation circuitry 14 uses the TLBs 50 to determine how to process requests directed to virtual addresses ranges that map to corresponding device memory 26 or main memory 10 address ranges. The entry to select from the memory mapping 18 is based on the requested virtual address, where each entry 50 in the memory mapping 18 corresponds to a virtual address range mapping to a device memory 26 or main memory 10 address range.

Figure 3:
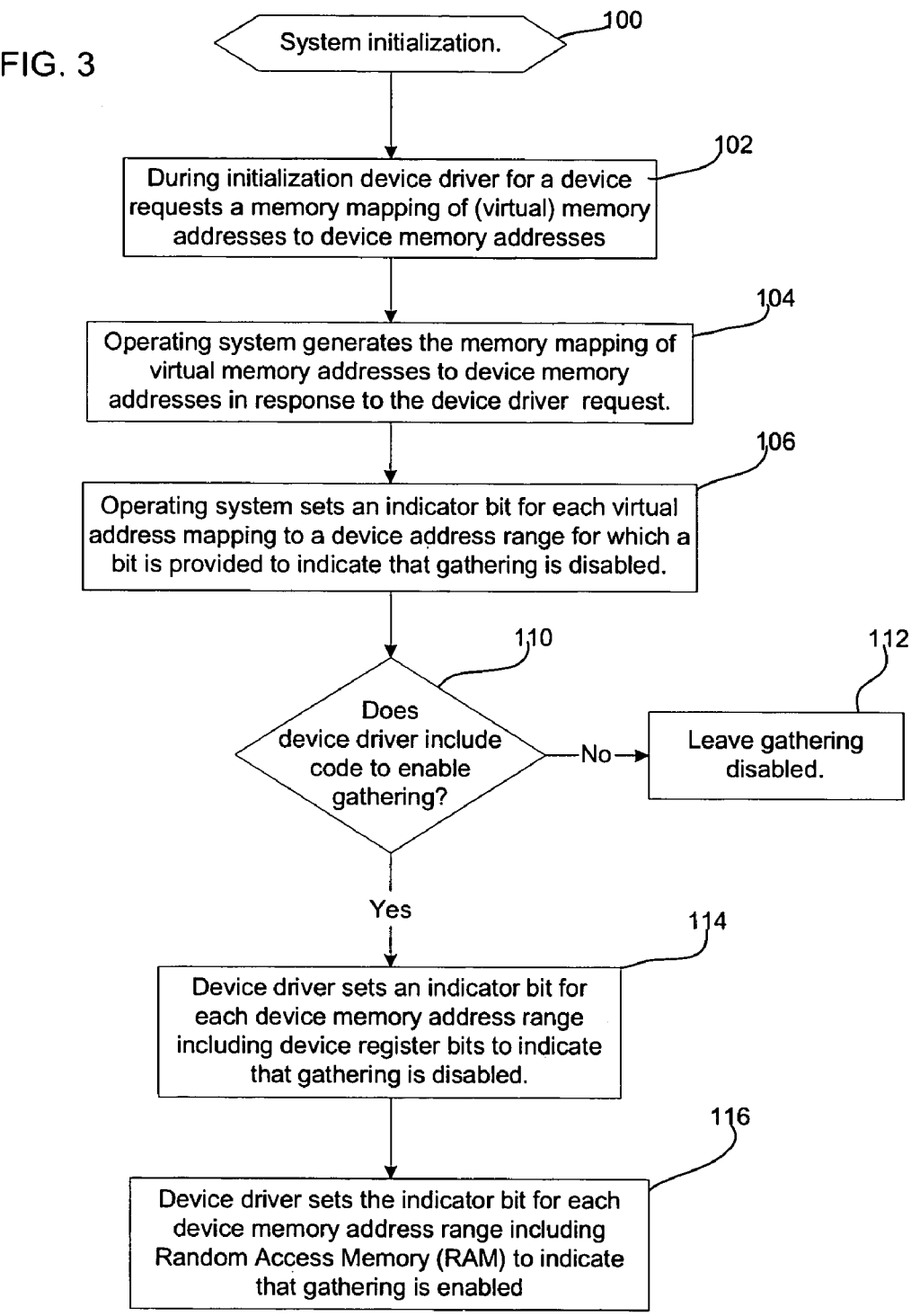
FIG. 3 illustrates an embodiment of operations to initialize a mapping of local memory addresses to device memory addresses.

FIG. 3 illustrates operations performed during system initialization (at block 100) to initialize data structures for memory mapping operations, such as information in the TLBs 50 for the virtual addresses ranges mapping to device memory 26 or main memory 10. Initialization may occur as a result of a power cycle or other similar type event. During initialization, the device driver 24 for the device 6 requests (at block 102) a memory mapping 18 of virtual addresses to device memory 26 addresses. In response, the operating system 22 generates (at block 104) the memory mapping 18 of virtual addresses to device memory 26 addresses. The operating system 22 sets (at block 106) an indicator bit for each device memory 26 and corresponding virtual address range for which a bit is provided to indicate that gathering is disabled. In MMIO embodiments, the indicator bit indicating whether gathering is enabled comprises a bit in the translation lookaside buffers (TLB). For instance, the bit in the TLBs 50 that is used to indicate whether gathering is enabled may comprise the guarded bit 58 (FIG. 2) that also indicates whether prefetching is enabled. In such an embodiment, prefetching is indicated as disabled if gathering is indicated as disabled and prefetching is indicated as enabled if gathering is indicated as enabled. The operating system 22 may also set additional bits for the virtual addresses mapping to device memory 26, including setting the write-thru flag 52 to "on" and the cache inhibitor to "on". In this way, the write thru occurs to the device memory 26 with caching inhibited so data is also not written into the cache.

The device driver 24 may or may not include code to enable store gathering. For instance, legacy device drivers may not include code to support hardware that aggregates multiple store operations into a single I/O bus transaction to burst transfer over the I/O bus 8. If (at block 110) the device driver 24 does not include code to enable store gathering, then the indicator bit set to a default value indicating no gathering by the operating system 22 remains (at block 112) indicating that there is no gathering for store operations. If the device driver 24 includes code to enable store gathering, then the device driver 24 sets (at block 114) an indicator bit for each device memory address range (mapping to the virtual address range identified by the entry 50) including device register bits, e.g., device registers 28, to indicate that gathering is disabled. In certain. embodiments, the device 6 may require that writes to the device registers 28 occur in separate bus transactions and not be aggregated into a single burst transaction over the bus 8. The device 6 may not be able to handle burst I/O transactions to the device registers 28 and require that transfers to the device registers 28 occur in separate I/O bus transactions. The device driver 24 further sets (at block 116) the indicator bit, e.g., guarded flag 58, for each device memory address range including device Random Access Memory (RAM) 28 to indicate that gathering is enabled for those device memory address ranges in the device RAM 28. Thus, multiple stores may be aggregated into a burst I/O transaction when transferring data over the bus 8 to the device RAM 28, as opposed to device registers 28.

Figure 4:
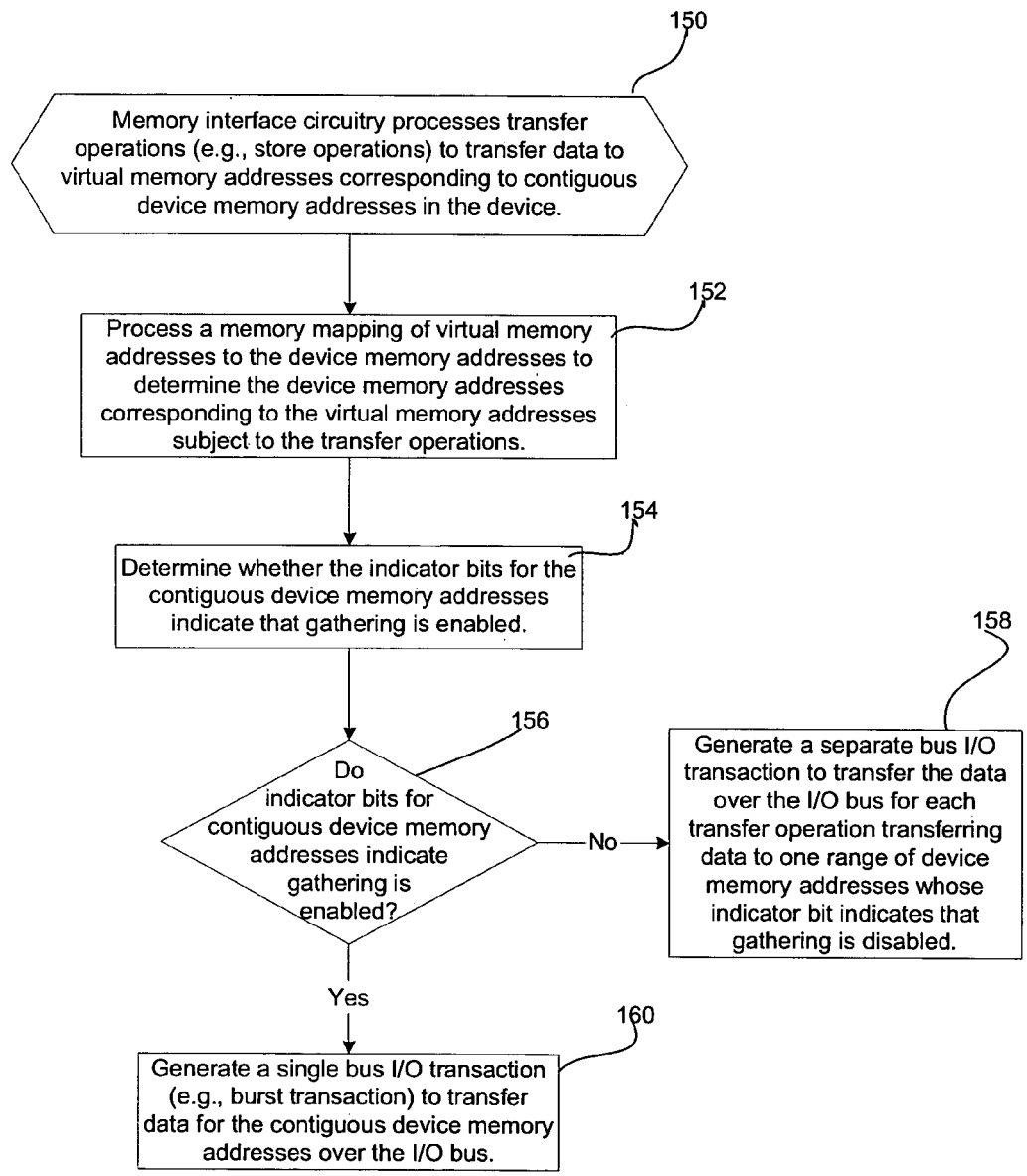
FIG. 4 illustrates an embodiment of operations to transfer data to local memory addresses to corresponding device memory addresses over an I/O bus.

FIG. 4 illustrates operations implemented in the address translation circuitry 14 to handle transfer operations, such as processor 4 store operations from processor registers 12 to virtual addresses that map to device memory 26 addresses. Control begins with the address translation circuitry 14 processing transfer operations (e.g., store operations) to transfer data to virtual addresses corresponding to contiguous device memory 26 addresses in the device 6. The address translation circuitry 14 processes (at block 152) a memory mapping 18 of virtual addresses to the device memory 26 addresses to determine the device memory 26 addresses corresponding to the virtual addresses subject to the transfer operations to the virtual addresses. A determination is further made (at block 154) as to whether the indicator bits, e.g., guarded flags 58, for the contiguous device memory 26 addresses indicate that gathering is enabled. If (at block 156) gathering is not enabled for the contiguous device memory 26 addresses to which the store operations transfer data, then the address translation circuitry 14 generates (at block 158) a separate bus I/O transaction to transfer the data over the I/O bus 8 for each transfer operation transferring data to one range of device memory addresses whose indicator bit, e.g., guarded flag 58, indicates that gathering is disabled. Otherwise, if gathering is enabled, then the address translation circuitry 14 generates (at block 160) a single bus I/O transaction (e.g., burst transaction) to transfer data for the contiguous device memory 26 addresses over the I/O bus 8.

ADDITIONAL EMBODIMENT DETAILS

The described operations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

Certain embodiments may be directed to a method for deploying computing instruction by a person or automated processing integrating computer-readable code into a computing system, wherein the code in combination with the computing system is enabled to perform the operations of the described embodiments.

FIG. 1 shows the address translation circuitry 14 implemented within the processor 14. In alternative embodiments, the address translation circuitry 14 may be implemented in circuitry external to the processor 4. Still further, the operations performed by the address translation circuitry 14 may be implemented by the processor 4 executing code or a program for memory interface operations.

The virtual addresses may map to cache in the main memory 10 or a high-speed access memory implemented on the integrated circuit die in which the processor 4 is implemented.

FIG. 2 shows certain information maintained for each range of local memory addresses, e.g., 4 Kb. In alternative embodiments, this information may be stored in different data structures having different formats and information than shown.

The illustrated operations of FIGS. 3 and 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   generating, by an operating system, a mapping of virtual memory addresses to device memory addresses in response to a request for a mapping from a device driver for a device;
   setting, by the device driver, indicator bits for ranges of device memory addresses in a device accessible over an Input/Output (I/O) bus indicating whether gathering is enabled for the device memory address ranges;
   processing, by address translation circuitry, multiple transfer operations to transfer data to virtual memory addresses;
   processing, by the address translation circuitry, the mapping of virtual memory addresses to the device memory addresses to determine contiguous device memory addresses corresponding to the virtual memory addresses subject to the multiple transfer operations;
   determining, by the address translation circuitry, whether the indicator bits for the determined contiguous device memory addresses indicate that gathering is enabled; and
   generating, by the address translation circuitry, a single bus I/O transaction to transfer data to the determined contiguous device memory addresses over the I/O bus in response to determining that the indicator bits for the contiguous device memory addresses indicate that gathering is enabled, wherein the address translation circuitry generates the single bus I/O transaction to transfer data for the multiple transfer operations.

2. The method of claim 1, wherein the transfer operations comprise store operations to copy data from at least one register over the I/O bus to the device memory addresses.

3. The method of claim 1, further comprising:
   generating a separate bus I/O transaction to transfer the data over the I/O bus for each transfer operation transferring data to one device memory addresses range whose indicator bit indicates that gathering is disabled.

4. The method of claim 1, wherein setting the indicator bits further comprises:
   setting the indicator bit for each device memory address range including device register bits to indicate that gathering is disabled; and
   setting the indicator bit for each device memory address range including device Random Access Memory (RAM) to indicate that gathering is enabled.

5. The method of claim 1, further comprising:
   setting, by the operating system, the indicator bits to indicate that gathering is disabled, wherein the device driver sets the indicator bits to indicate that gathering is enabled, and wherein if the device driver does not include code to set the indicator bits to indicate that gathering is enabled, then the address translation circuitry does not generate single bus I/O transactions for the multiple transfer operations to the virtual addresses.

6. The method of claim 1, wherein the address translation circuitry implements a Memory Mapped Input/Output (MMIO) protocol and wherein the indicator bit indicating whether gathering is enabled for each device memory address range comprises a bit in translation lookaside buffer (TLB), wherein there is one TLB for each range of device memory addresses.

7. The method of claim 6, wherein the bit in the TLBs that indicates whether gathering is enabled additionally comprises a guarded bit indicating whether prefetching is enabled, wherein prefetching is indicated as disabled if gathering is indicated as disabled and wherein prefetching is indicated as enabled if gathering is indicated as enabled.

8. The method of claim 1, wherein the single bus I/O transaction comprises a burst transaction over the I/O bus.

9. A system in communication with a device having a device memory, comprising:
   a memory;
   a device driver for the device in communication with the memory, wherein the device driver sets indicator bits in the memory for ranges of device memory addresses in the device memory accessible over an Input/Output (I/O) bus indicating whether gathering is enabled for the device memory address ranges;
   an operating system for generating a mapping in the memory of virtual memory addresses to device memory addresses in response to a request for a mapping from the device driver; and
   address translation circuitry enabled to cause operations to be performed, the operations comprising:
      processing multiple transfer operations to transfer data to virtual memory addresses;
      processing the mapping of virtual memory addresses to the device memory addresses to determine contiguous device memory addresses corresponding to the virtual memory addresses subject to the multiple transfer operations;
      determining whether the indicator bits in the memory for the determined contiguous device memory addresses indicate that gathering is enabled; and
      generating a single bus I/O transaction to transfer data to the determined contiguous device memory addresses over the I/O bus in response to determining that the indicator bits for the contiguous device memory addresses indicate that gathering is enabled, wherein the address translation circuitry generates the single bus I/O transaction to transfer data for the multiple transfer operations.

10. The system of claim 9, wherein the transfer operations comprise store operations to copy data from at least one register over the I/O bus to the device memory addresses.

11. The system of claim 9, wherein the operations caused by the address translation circuitry further comprise:
   generating a separate bus I/O transaction to transfer the data over the I/O bus for each transfer operation transferring data to one device memory addresses range whose indicator bit indicates that gathering is disabled.

12. The system of claim 9, wherein setting the indicator bits further comprises:
   setting the indicator bit for each device memory address range including device register bits to indicate that gathering is disabled; and
   setting the indicator bit for each device memory address range including device Random Access Memory (RAM) to indicate that gathering is enabled.

13. The system of claim 9, wherein the operating system is further enabled to cause operations comprising:
   setting the indicator bits to indicate that gathering is disabled, wherein the device driver sets the indicator bits to indicate that gathering is enabled, and wherein if the device driver does not include code to set the indicator bits to indicate that gathering is enabled, then the address translation circuitry does not generate single bus I/O transactions for the multiple transfer operations to the virtual addresses.

14. The system of claim 9, wherein the address translation circuitry implements a Memory Mapped Input/Output (MMIO) protocol and wherein the indicator bit indicating whether gathering is enabled for each device memory address range comprises a bit in translation lookaside buffer (TLB), wherein there is one TLB for each range of device memory addresses.

15. The system of claim 14, wherein the bit in the TLBs that indicates whether gathering is enabled additionally comprises a guarded bit indicating whether prefetching is enabled, wherein prefetching is indicated as disabled if gathering is indicated as disabled and wherein prefetching is indicated as enabled if gathering is indicated as enabled.

16. The system of claim 9, wherein the single bus I/O transaction comprises a burst transaction over the I/O bus.

17. An article of manufacture comprising at least one of hardware logic and a computer readable storage media having computer executable code to communicate with a device having a device memory and to implement an operating system, device driver, and address translation circuitry to cause operations to be performed, the operations comprising:
   generating, by the operating system, a mapping of virtual memory addresses to device memory addresses in response to a request for a mapping from the device driver for the device;
   setting, by the device driver, indicator bits for ranges of device memory addresses in the device accessible over an Input/Output (I/O) bus indicating whether gathering is enabled for the device memory address ranges;
   processing, by the address translation circuitry, multiple transfer operations to transfer data to virtual memory addresses in the device;
   processing, by the address translation circuitry, the mapping of virtual memory addresses to the device memory addresses to determine contiguous device memory addresses corresponding to the virtual memory addresses subject to the multiple transfer operations;
   determining, by the address translation circuitry, whether the indicator bits for the determined contiguous device memory addresses indicate that gathering is enabled; and
   generating, by the address translation circuitry, a single bus I/O transaction to transfer data to the determined contiguous device memory addresses over the I/O bus in response to determining that the indicator bits for the contiguous device memory addresses indicate that gathering is enabled, wherein the address translation circuitry generates the single bus I/O transaction to transfer data for the multiple transfer operations.

18. The article of manufacture of claim 17, wherein the transfer operations comprise store operations to copy data from at least one register over the I/O bus to the device memory addresses.

19. The article of manufacture of claim 17, wherein the operations further comprise:
   generating a separate bus I/O transaction to transfer the data over the I/O bus for each transfer operation transferring data to one device memory addresses range whose indicator bit indicates that gathering is disabled.

20. The article of manufacture of claim 17, wherein setting the indicator bits further comprises:
   setting the indicator bit for each device memory address range including device register bits to indicate that gathering is disabled; and
   setting the indicator bit for each device memory address range including device Random Access Memory (RAM) to indicate that gathering is enabled.

21. The article of manufacture of claim 17, wherein the operating system sets the indicator bits to indicate that gathering is disabled, wherein the device driver sets the indicator bits to indicate that gathering is enabled, and wherein if the device driver does not include code to set the indicator bits to indicate that gathering is enabled, then the address translation circuitry does not generate single bus I/O transactions for the multiple transfer operations to the virtual addresses.

22. The article of manufacture of claim 17, wherein the address translation circuitry implements a Memory Mapped Input/Output (MMIO) protocol and wherein the indicator bit indicating whether gathering is enabled for each device memory address range comprises a bit in translation lookaside buffer (TLB), wherein there is one TLB for each range of device memory addresses.

23. The article of manufacture of claim 22, wherein the bit in the TLBs that indicates whether gathering is enabled additionally comprises a guarded bit indicating whether prefetching is enabled, wherein prefetching is indicated as disabled if gathering is indicated as disabled and wherein prefetching is indicated as enabled if gathering is indicated as enabled.

24. The article of manufacture of claim 17, wherein the single bus I/O transaction comprises a burst transaction over the I/O bus.

25. A method for deploying computing instruction, comprising integrating computer-readable code into a computing system, wherein the code implements an operating system, a device driver, and address translation code that in combination with the computing system is enabled to perform:
   generating, by the operating system, a mapping of virtual memory addresses to device memory addresses in response to a request for a mapping from the device driver for the device;
   setting, by the device driver, indicator bits for ranges of device memory addresses in a device accessible over an Input/Output (I/O) bus indicating whether gathering is enabled for the device memory address ranges;
   processing, by the address translation code, multiple transfer operations to transfer data to virtual memory addresses;
   processing, by the address translation code, the mapping of virtual memory addresses to the device memory addresses to determine contiguous device memory addresses corresponding to the virtual memory addresses subject to the multiple transfer operations;
   determining, by the address translation code, whether the indicator bits for the contiguous device memory addresses indicate that gathering is enabled; and
   generating, by the address translation code, a single bus I/O transaction to transfer data for the contiguous device memory addresses over the I/O bus in response to determining that the indicator bits for the contiguous device memory addresses indicate that gathering is enabled.

26. The method of claim 25, further comprising:
   generating a separate bus I/O transaction to transfer the data over the I/O bus for each transfer operation transferring data to one device memory addresses range whose indicator bit indicates that gathering is disabled.

27. The method of claim 25, wherein setting the indicator bits further comprises:
   setting the indicator bit for each device memory address range including device register bits to indicate that gathering is disabled; and
   setting the indicator bit for each device memory address range including device Random Access Memory (RAM) to indicate that gathering is enabled.

* * * * *